(12) United States Patent
Daum et al.

(10) Patent No.: US 8,658,121 B2
(45) Date of Patent: Feb. 25, 2014

(54) METHOD AND APPARATUS FOR ADJUSTING THE CONCENTRATION OF ACIDS OR LYES

(75) Inventors: Karl-Heinz Daum, Mainz (DE); Henry Eisermann, Ingelheim (DE); Wolfram Schalk, Bad Homburg (DE)

(73) Assignee: Outotec Oyj, Espoo (FI)

( * ) Notice: Subject to any disclaimer, the term of this patent is extended or adjusted under 35 U.S.C. 154(b) by 15 days.

(21) Appl. No.: 13/577,013

(22) PCT Filed: Jan. 11, 2011

(86) PCT No.: PCT/EP2011/000073
§ 371 (c)(1),
(2), (4) Date: Aug. 3, 2012

(87) PCT Pub. No.: WO2011/095271
PCT Pub. Date: Aug. 11, 2011

(65) Prior Publication Data
US 2012/0308473 A1  Dec. 6, 2012

(30) Foreign Application Priority Data
Feb. 8, 2010 (DE) .......................... 10 2010 007 303

(51) Int. Cl.
*B01F 5/00* (2006.01)
*B01J 19/00* (2006.01)
*C01B 17/69* (2006.01)
*C01B 17/80* (2006.01)

(52) U.S. Cl.
USPC ........... 423/522; 422/160; 422/161; 422/224; 366/131; 366/167.1; 366/336

(58) Field of Classification Search
USPC ........... 423/522; 422/160, 161, 224; 366/131, 366/167.1, 336
See application file for complete search history.

(56) References Cited

U.S. PATENT DOCUMENTS 3,201,205 A * 8/1965 Gaylord, Jr. et al. ......... 422/202
3,847,809 A  11/1974 Kopf
(Continued)

FOREIGN PATENT DOCUMENTS

DE  10317865 A1  10/2004
EP  2145676 A1  1/2010
(Continued)

OTHER PUBLICATIONS

Mueller, H. "Sulfuric Acid and Sulfur Trioxide". Ullmann's Encyclopedia of Industrial Chemistry, p. 1-71, Jan. 1, 2000.
(Continued)

*Primary Examiner* — Timothy Vanoy
(74) *Attorney, Agent, or Firm* — Leydig, Voit, & Mayer, Ltd.

(57) ABSTRACT

A method for adjusting a concentration of an acid or lye includes charging a medium for adjusting the concentration of the acid or lye into a supply conduit of the acid or lye so as to provide a combined stream. The combined stream is supplied through an inlet to a mixing chamber such that the combined stream is deflected upon entering the mixing chamber. The combined stream is mixed in the mixing chamber. The combined stream is discharged through an outlet of the mixing chamber such that the combined stream is again deflected upon being discharged from the mixing chamber.

12 Claims, 2 Drawing Sheets

(56) References Cited

U.S. PATENT DOCUMENTS

| | | |
|---|---|---|
| 4,237,008 A | 12/1980 | Ratigan et al. |
| 4,573,803 A | 3/1986 | Gritters et al. |
| 5,762,416 A | 6/1998 | LeSire |
| 6,386,750 B2 | 5/2002 | Marelli |
| 6,568,661 B1 | 5/2003 | Shane |
| 2009/0180939 A1 | 7/2009 | Hagen et al. |

FOREIGN PATENT DOCUMENTS

| | | |
|---|---|---|
| GB | 1010534 A | 11/1965 |
| GB | 2106408 A | 4/1983 |
| JP | 60257825 A | 12/1985 |
| WO | WO 2004035187 A | 4/2004 |

OTHER PUBLICATIONS

European Patent Office, International Search Report in International Patent Application No. PCT/EP2011/000073 (Jan. 11, 2011).

Ullmann's Encyclopedia of Industrial Chemistry, 5th edition, vol. A25, pp. 635 to 700 (Jan. 1994).

\* cited by examiner

Prior Art

US 8,658,121 B2

METHOD AND APPARATUS FOR ADJUSTING THE CONCENTRATION OF ACIDS OR LYES

CROSS-REFERENCE TO PRIOR APPLICATIONS

This application is a U.S. National Phase application under 35 U.S.C. §371 of International Application No. PCT/EP2011/000073, filed on Jan. 11, 2011, and claims benefit to German Patent Application No. DE 10 2010 007 303.2, filed on Feb. 8, 2010. The International Application was published in English on Aug. 11, 2011 as WO 2011/095271 under PCT Article 21(2).

FIELD

The present invention relates to the adjustment of the concentration of acids or lyes, in particular of sulfuric acid, wherein the acid or lye is supplied through an inlet to a mixing chamber and is mixed therein with a medium for adjusting the concentration, and wherein the concentration-adjusted acid or lye is discharged from the mixing chamber through an outlet.

Subsequently, the concentration adjustment is described with reference to sulfuric acid. However, the present invention is not limited thereto and can generally be applied for adjusting the concentration of acids or lyes.

BACKGROUND

Sulfuric acid, which is a very important starting material for the chemical industry, usually is produced by the so-called double absorption process as it is described for example in Ullmann's Encyclopedia of Industrial Chemistry, 5th edition, vol. A25, pages 635 to 700. Sulfur dioxide ($SO_2$) is converted to sulfur trioxide ($SO_3$) in a converter by means of a catalyst. The sulfur trioxide obtained is withdrawn after the converter and supplied to an intermediate absorber or a final absorber (e.g. hot absorber), in which the gas containing sulfur trioxide is guided in counterflow to concentrated sulfuric acid ($H_2SO_4$) and absorbed in the same. The resulting highly concentrated sulfuric acid is partly withdrawn as product and upon dilution with water partly recirculated to the absorber for renewed absorption.

To adjust the acid concentration for the absorber circuit, apparatuses as shown in FIG. 1 have been used so far. In these apparatuses, concentrated sulfuric acid is supplied through a supply conduit via an inlet to a mixing chamber which substantially is disposed at right angles to the supply conduit. Into the end adjacent to the inlet a lance with nozzle openings (so-called "clarinet") extends, through which water is charged to the sulfuric acid stream for adjusting the concentration, i.e. for dilution. In the mixing chamber concentrated sulfuric acid and water are mixed and the concentration-adjusted sulfuric acid is removed through a discharge conduit via an outlet at the end opposite to the supply conduit. For intermixing concentrated sulfuric acid and water, static mixers can also be incorporated in the mixing chamber. However, the flow cross-section is reduced thereby, which leads to a pressure loss. Despite the comparatively large amount of equipment, no uniform concentration can be achieved at the entrance to the outlet conduit. As seen over the cross-section of the conduit, the concentration deviations are about 0.5 wt-%.

SUMMARY

In an embodiment, the present invention provides a method for adjusting a concentration of an acid or lye. A medium for adjusting the concentration of the acid or lye is charged into a supply conduit of the acid or lye so as to provide a combined stream. The combined stream is supplied through an inlet to a mixing chamber such that the combined stream is deflected upon entering the mixing chamber. The combined stream is mixed in the mixing chamber. The combined stream is discharged through an outlet of the mixing chamber such that the combined stream is deflected upon being discharged from the mixing chamber.

BRIEF DESCRIPTION OF THE DRAWINGS

The present invention will be described in even greater detail below based on the exemplary figures. The invention is not limited to the exemplary embodiments. Features described and/or represented in the various figures can be used alone or combined in embodiments of the present invention. Other features and advantages of various embodiments of the present invention will become apparent by reading the following detailed description with reference to the attached drawings which illustrate the following.

DETAILED DESCRIPTION

Figure 1:
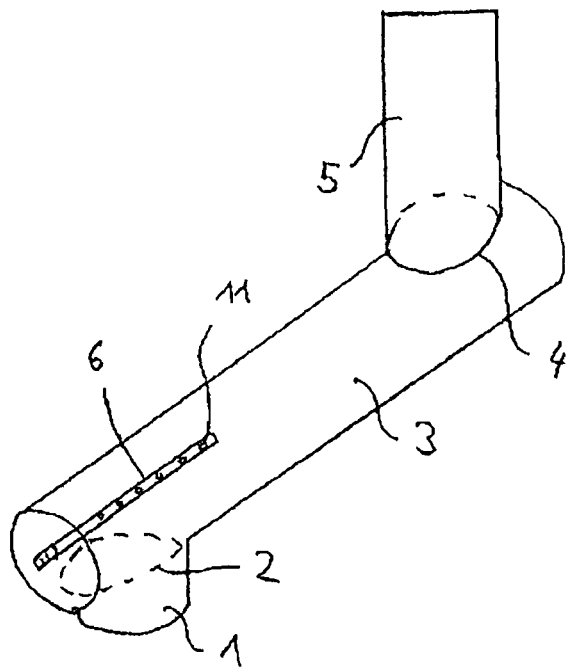
FIG. 1 shows an apparatus for concentration adjustment according to the prior art in a schematic view.

In an embodiment, the present invention provides a uniform dilution of the acid or lye and small concentration deviations with low pressure loss.

In the method according to an embodiment of the invention, a uniform dilution of the acid or lye and small concentration deviations with low pressure loss substantially is provided in that the medium for adjusting the concentration, in particular water, is charged to the acid or lye before the inlet to the mixing chamber and the acid stream or lye stream and the stream of the medium subsequently are deflected preferably by 90°.

By charging the medium still before the mixing chamber and subsequently deflecting the streams at the inlet of the mixing chamber an intensive intermixing is achieved, which leads to a distinctly more homogeneous concentration distribution in the acid or lye as compared to conventional methods.

In an advantageous development of the process of an embodiment of the invention, the medium for adjusting the concentration preferably is charged via a nozzle device, substantially uniformly distributed over the cross-section of the acid stream or lye stream. Beside the above-mentioned advantage of intensive intermixing, this involves the further advantage that only a small concentration deviation is obtained at the outlet of the mixing chamber.

The present invention furthermore relates to an apparatus suitable for performing the above method, comprising a supply conduit for the acid or lye, a mixing chamber adjoining the supply conduit substantially at right angles, and a discharge conduit leaving the mixing chamber at the end opposite to the supply conduit. In accordance with an embodiment of the invention, between the supply conduit and the mixing chamber a nozzle device is provided for charging a medium for adjusting the concentration.

Due to the inventive arrangement of the nozzle device, the medium is charged to the acid stream or lye stream earlier than in conventional apparatuses, and said stream is also forced to a deflection at the inlet of the mixing chamber, whereby an intensive intermixing and hence a homogeneous concentration distribution in the acid or lye is achieved.

In accordance with an embodiment of the invention, it was found to be advantageous to arrange the nozzle device substantially at right angles with respect to the axis (A) of the supply conduit.

Beside the effect that the acid stream or lye stream is forced to a deflection, it can be omitted to incorporate static mixers in the mixing chamber as in the prior art and thus increase the flow resistance. The pressure loss in the mixing chamber is reduced correspondingly.

In accordance with a first embodiment of the invention, the nozzle device includes at least one, but preferably a plurality of nozzle tube(s), which is/are arranged transversely through the supply conduit and include(s) a plurality of nozzle openings.

In another, particularly preferred embodiment the nozzle device is configured as a substantially ring-shaped flange (nozzle ring) and includes at least one web with nozzle openings. The nozzle device preferably includes several, for example three or four webs with nozzle openings, which are aligned in a fan-shaped manner. Depending on the design of the plant and the intended flow rate, the number of webs can however be varied in almost any way. It likewise lies within the scope of the invention to also provide nozzle openings in the nozzle ring itself, in order to also charge the medium from the side to the acid stream or lye stream.

By supplying the medium via the nozzle ring and the at least one web, it is already uniformly distributed over the cross-section of the acid stream or lye stream when being charged, so that only a small concentration deviation is present at the outlet of the mixing chamber. At the same time, only a small flow resistance is produced by the arrangement, so that the pressure loss in the acid stream or lye stream is kept low.

In accordance with an embodiment of the invention, the nozzle openings are directed in or against the flow direction of the acid or lye, the latter variant being preferred, as intermixing is promoted by the additional deflection and turbulent mixing.

By means of the invention, the concentration deviation of the acid or lye of about 0.5 wt-% as known from the prior art can be reduced to below 0.1 wt-%.

A plant for the concentration adjustment of sulfuric acid, as it is known from the prior art, is shown in FIG. 1. The apparatus comprises a supply conduit 1 for concentrated sulfuric acid, which is connected with an inlet 2 of a mixing chamber 3. The mixing chamber 3 is disposed substantially at right angles to the supply conduit 1 and has an outlet 4 at the end opposite to the supply conduit 1, which is connected with a discharge conduit 5. The discharge conduit 5 likewise is disposed substantially at right angles to the mixing chamber 3 and substantially is located in the same plane as the supply conduit 1.

In the end of the mixing chamber 3 adjacent to the inlet 2, a lance 6 with nozzle openings (so-called "clarinet") is arranged, through which water can be injected into the sulfuric acid stream. In addition, static mixers can also be incorporated in the mixing chamber 3, which are not shown in the Figure.

Figure 2:
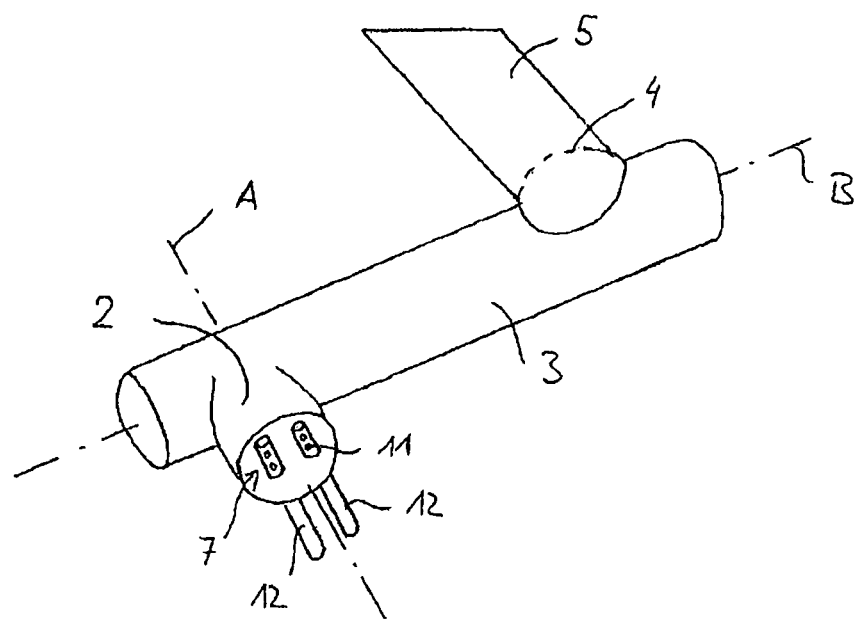
FIG. 2 shows an inventive apparatus for concentration adjustment according to a first embodiment of the invention in a schematic view.

FIG. 2 shows a plant for concentration adjustment in accordance with the invention, whose basic elements correspond with those of the plant from the prior art as shown in FIG. 1 and therefore are provided with the same reference numerals, so that in so far reference is made to the above description.

In contrast to the prior art, the so-called clarinet protruding into the mixing chamber 3 and possible static mixers are omitted. Instead, a nozzle device in the form of a plurality of nozzle tubes 7 is mounted between the end of the supply conduit 1 and the inlet 2 of the mixing chamber 3, through which water is injected into the sulfuric acid stream. The nozzle openings 11 of the tubes 12 can be arranged in flow direction of the sulfuric acid, but, as shown, preferably are arranged on the opposite side of the nozzle tubes 12, in order to promote intermixing by the additional deflection and turbulent mixing.

Figure 3:
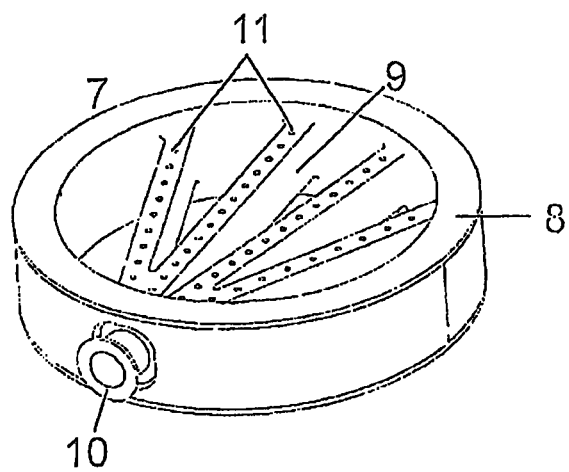
FIG. 3 shows a configuration of a nozzle device in a second embodiment as nozzle ring.

Instead of one or more nozzle tubes 12, as depicted in FIG. 2, the nozzle device 7 can also constitute a ring-shaped flange (nozzle ring) 8 as shown in FIG. 3, whose dimensions are adjusted to the point of connection between supply conduit 1 and inlet 2 of the mixing chamber 3. In the nozzle ring 8, four hollow webs 9 are arranged in a fan-shaped manner. On the base of the fan-shaped arrangement, the hollow webs 9 are connected with a port 10 through the nozzle ring 8, to which port the water supply can be connected, e.g. flange-mounted.

Figure 4:
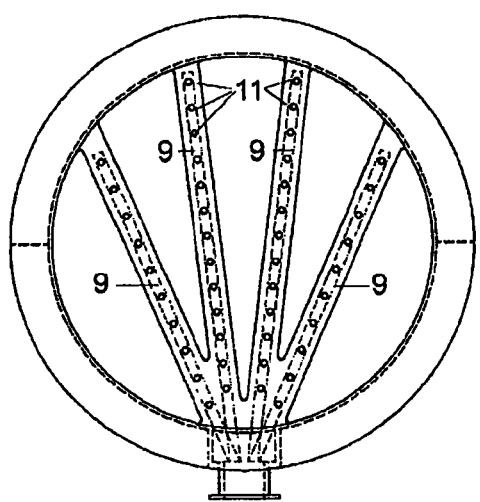
FIG. 4 shows an enlarged partial view of the nozzle ring shown in FIG. 3.

FIG. 4 shows a detailed representation of the four hollow webs 9 of the nozzle ring 7 depicted in FIG. 3. On one side of the hollow webs 9, which points in or preferably against the flow direction of the sulfuric acid, nozzle openings 11 are arranged, through which the water is injected into the sulfuric acid. Nozzle openings 11 can also be disposed in the nozzle ring 8 itself in accordance with an embodiment the invention.

EXAMPLE

Proceeding from the basic configuration of the plant for concentration adjustment, as it is shown in FIG. 1, model calculations and simulations were performed for the apparatus in accordance with the prior art and the apparatus in accordance with the invention. There was used a sulfuric acid stream of 1,623 t/h with 99.5 wt-% $H_2SO_4$, into which 13.6 t/h of water are injected.

At the outlet of the mixing chamber of the conventional plant, a fluctuation range from 98.458 wt-% to 99.048 wt-% $H_2SO_4$ was determined over the cross-section of the outlet from the mixing chamber, i.e. a deviation between 0.4% and 0.5%.

On the other hand, at the outlet of the mixing chamber of the plant in accordance with the invention a deviation of less than 0.1 wt-% was determined with a fluctuation range of 98.681 wt-% to 98.775 wt-% $H_2SO_4$.

Consequently, the present invention substantially contributes to a distinct reduction of the concentration deviations.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS 1 supply conduit
2 inlet
3 mixing chamber
4 outlet
5 discharge conduit 6 lance ("clarinet")
7 nozzle device
8 ring-shaped flange ("nozzle ring")
9 web
10 port
11 nozzle openings
12 nozzle tube

The invention claimed is:

1. A method for adjusting a concentration of an acid or lye comprising:
   charging a medium for adjusting the concentration of the acid or lye into a supply conduit of the acid or lye so as to provide a combined stream;
   supplying the combined stream through an inlet to a mixing chamber such that the combined stream is deflected upon entering the mixing chamber;
   mixing the combined stream in the mixing chamber; and
   discharging the combined stream through an outlet of the mixing chamber such that the combined stream is deflected upon being discharged from the mixing chamber.

2. The method according to claim 1, wherein the acid or lye is sulfuric acid and the medium is water.

3. The method according to claim 1, wherein the combined stream is deflected in each case by 90°.

4. The method according to claim 1, wherein the charging is performed using a nozzle device so as to be substantially uniformly distributed over a cross-section of a stream of the acid or lye.

5. An apparatus for adjusting the concentration of an acid or lye comprising:
   a supply conduit for the acid or lye;
   a nozzle device disposed in the supply conduit and configured to charge the supply conduit with a medium for adjusting the concentration of the acid or lye;
   a mixing chamber adjoining the supply conduit substantially at a right angle; and
   a discharge conduit leaving the mixing chamber substantially at a right angle at an end of the mixing chamber opposite to the supply conduit.

6. The apparatus according to claim 5, wherein the nozzle device is disposed substantially at a right angle to an axis of the supply conduit.

7. The apparatus according to claim 5, wherein the nozzle device includes at least one nozzle tube having a plurality of nozzle openings and extending transversely through the supply conduit.

8. The apparatus according to claim 5, wherein the nozzle device includes a nozzle ring in which at least one web with nozzle openings is arranged.

9. The apparatus according to claim 8, wherein the at least one web is a plurality of webs aligned with respect to each other in a fan-shaped manner in the nozzle ring.

10. The apparatus according to claim 8, wherein nozzle openings are formed in the nozzle ring.

11. The apparatus according to claim 5, wherein the nozzle device includes nozzle openings that are directed against a flow direction of the supply conduit.

12. The apparatus according to claim 5, wherein the nozzle device includes nozzle openings that are directed in a flow direction of the supply conduit.

* * * * *